(12) United States Patent
Chau et al.

(10) Patent No.: US 10,759,689 B2
(45) Date of Patent: Sep. 1, 2020

(54) FORMING METHOD FOR CURVED GLASS

(71) Applicant: LENS TECHNOLOGY (CHANGSHA) CO., LTD, Changsha (CN)

(72) Inventors: Kwan Fei Chau, Changsha (CN); Qiaobing Rao, Changsha (CN); Feng Peng, Changsha (CN)

(73) Assignee: Lens Technology (Changsha) Co., Ltd., Changsha (CN)

( * ) Notice: Subject to any disclaimer, the term of this patent is extended or adjusted under 35 U.S.C. 154(b) by 225 days.

(21) Appl. No.: 15/536,594

(22) PCT Filed: Sep. 10, 2015

(86) PCT No.: PCT/CN2015/089369
§ 371 (c)(1),
(2) Date: Jun. 15, 2017

(87) PCT Pub. No.: WO2016/095573
PCT Pub. Date: Jun. 23, 2016

(65) Prior Publication Data
US 2017/0341969 A1    Nov. 30, 2017

(30) Foreign Application Priority Data
Dec. 16, 2014    (CN) .......................... 2014 1 0782315

(51) Int. Cl.
C03B 23/03    (2006.01)
C03B 40/00    (2006.01)
C03B 25/02    (2006.01)

(52) U.S. Cl.
CPC ...... *C03B 23/0302* (2013.01); *C03B 23/0307* (2013.01); *C03B 25/025* (2013.01); *C03B 40/00* (2013.01); *Y02P 40/57* (2015.11)

(58) Field of Classification Search
CPC ... C03B 23/0302; C03B 23/02; C03B 23/023; C03B 23/0305; C03B 23/0307;
(Continued)

(56) References Cited

U.S. PATENT DOCUMENTS 5,019,689 A  *  5/1991  Bollier ................ C03B 23/0357
                                                    219/388
5,849,057 A    12/1998  Didelot
(Continued)

FOREIGN PATENT DOCUMENTS

CN    1103055 A    5/1995
CN    102329071 A    1/2012
(Continued)

OTHER PUBLICATIONS

English language machine translation of KR20110096455A—Accessed at patents.google.com on Mar. 24, 2019 (Year: 2010).*
(Continued)

*Primary Examiner* — Jason L Lazorcik
(74) *Attorney, Agent, or Firm* — Henry Patent Law Firm PLLC

(57) ABSTRACT

A forming method for curved glass has been provided. The method comprises: placing a flat glass plate in a pattern die, and placing the pattern die in a forming apparatus; and subjecting the pattern die successively to staged heating, staged forming and staged cooling, so as to obtain the curved glass, wherein the staged heating is performed over stages which are different from each other in temperature, the staged forming is performed over stages which are different from each other in temperature, and during at least one of the stages, a varying pressure which varies from low pressure to high pressure is applied to the pattern die, the staged cooling is performed by cooling the glass plate in the pattern die over stages which are different from each other in temperature.

(Continued)

The glass product could be used as front and rear covers of electronic products including notebook computers, mobile phones, tablet computers and smart watches.

10 Claims, 1 Drawing Sheet

(58) Field of Classification Search
CPC .............. C03B 23/03; C03B 23/03023; C03B 23/0256; C03B 23/035–23/0357
See application file for complete search history.

(56) References Cited

U.S. PATENT DOCUMENTS

| | | | | |
|---|---|---|---|---|
| 2010/0281919 | A1* | 11/2010 | Bailey | C03B 23/0357 65/29.19 |
| 2012/0216573 | A1* | 8/2012 | Dannoux | C03B 29/08 65/104 |
| 2012/0297828 | A1* | 11/2012 | Bailey | C03B 23/0357 65/29.18 |
| 2013/0125588 | A1* | 5/2013 | Kladias | C03B 23/0235 65/103 |
| 2013/0125589 | A1* | 5/2013 | Dannoux | C03B 23/0258 65/106 |
| 2013/0136565 | A1* | 5/2013 | Amsden | B25J 15/0052 414/191 |
| 2014/0013803 | A1* | 1/2014 | Hwang | C03B 23/0305 65/32.1 |
| 2014/0234581 | A1* | 8/2014 | Immerman | C03B 23/0357 428/141 |
| 2014/0373573 | A1* | 12/2014 | Hwang | C03B 23/0302 65/104 |
| 2015/0114042 | A1* | 4/2015 | Gaylo | C03B 23/025 65/29.1 |
| 2015/0321940 | A1* | 11/2015 | Dannoux | C03B 23/0256 65/106 |
| 2016/0368807 | A1* | 12/2016 | Bisson | C03B 23/0235 |
| 2017/0022086 | A1* | 1/2017 | Kim | C03B 40/00 |
| 2017/0274626 | A1* | 9/2017 | Ukrainczyk | C03B 23/0355 |
| 2017/0283295 | A1* | 10/2017 | Immerman | C03B 11/125 |
| 2017/0297944 | A1* | 10/2017 | Yea | C03B 23/0357 |
| 2017/0349472 | A1* | 12/2017 | Jung | C03B 23/0357 |

FOREIGN PATENT DOCUMENTS

| | | |
|---|---|---|
| CN | 103803779 A | 5/2014 |
| CN | 104023099 A | 9/2014 |
| CN | 104445888 A | 3/2015 |
| KR | 1020110096455 | 8/2011 |
| KR | 101121449 | 3/2012 |

OTHER PUBLICATIONS

English language human translation of KR 1020110096455.*
State Intellectual Property Office of the P.R. China; First Office Action for CN App. No. 201410782315.6; May 4, 2016; 5 pages.
State Intellectual Property Office of the P.R. China; Second Office Action for CN App. No. 201410782315.6; Jan. 22, 2017; 3 pages.
State Intellectual Property Office of the P.R. China; International Search Report & Written Opinion for PCT/CN2015/089369; Oct. 13, 2015; 4 pages.

* cited by examiner

FORMING METHOD FOR CURVED GLASS

TECHNICAL FIELD

The present disclosure relates to a forming method for a curved glass panel, and in particular, to a forming method for a curved glass product that has high dimensional accuracy, excellent appearance and ultralow wall thickness.

RELATED ART

At present, a curved glass panel is usually formed through direct hot pressing or machining. Specifically, the forming method of hot pressing comprises the steps of placing a flat glass panel in a pattern die consisting of an upper die and a lower die, heating the glass panel together with the upper and lower dies to a temperature of about 800° C.—higher than a softening point of the glass, pressing the glass panel by moving the upper die towards the lower die so as to deform the upper and lower surfaces of the glass panel, and cooling the glass panel. Such a method leads to a curved glass panel. However, a stress can be easily generated in the resultant glass panel. In addition to the defect of a low yield at which a curved glass panel can be obtained, the glass panel has appearance defects such as quantities of pits, indentations, and irregular upper and lower surfaces.

The Chinese patent application No. 201410279379 provides a forming method for a curved glass panel usable in a mobile phone. The method comprises: placing a flat glass panel in a pattern die (which is a graphitic pattern die consisting of the two parts of a female die and a male die), applying a pressure of 80-120 g/cm² (0.008-0.012 MPa) on a surface of the pattern die, heating the pattern die, in a furnace with protective atmosphere, over three stages to a temperature that is 10-30° C. lower than a softening temperature of the glass, keeping the pattern die at the temperature for a period of time, and cooling the pattern die as the furnace cools to room temperature. The heating procedure in the furnace with protective atmosphere is divided into three stages, consisting of a first stage of heating the pattern die at a rate of 15-25° C./min until the temperature reaches 630-650° C. and keeping the pattern die at that temperature for 15-20 min, a second stage of heating the pattern die at a rate of 18-30° C./min until the temperature reaches 695-715° C. and keeping the pattern die at that temperature for 8-12 Min, and a third stage of heating the pattern die at a rate of 20-35° C./min until the temperature reaches a temperature that is 10-30° C. lower than a softening temperature T of the glass and keeping the pattern die at that temperature for 6-10 min. In the cooling procedure, the furnace is controlled to cool at a rate of 35-42° C./min. The method described as above still has the defect of a low yield at which the glass panel usable in a mobile phone can be obtained.

The method of machining comprises machining a flat glass panel with a cutter to form a curved surface, and polishing the curved surface. The machining method usually takes rather long a time and costs much. And polishing a curved surface is a complicated process.

Hence, it is desirable to provide a forming method for a curved glass panel that comprises simple steps, has a high yield, and enables the glass panel to have high dimensional accuracy and few appearance defects.

SUMMARY

At least one of the objects of the present disclosure is to provide a forming method for a curved glass panel that comprises simple steps, has a high yield, and enables the glass panel to have high dimensional accuracy and few appearance defects.

According to the present disclosure, there is provided a forming method for curved glass, comprising: placing a flat glass plate in a pattern die, placing the pattern die in a forming apparatus, and subjecting the pattern die successively to staged heating, staged forming and staged cooling, so as to obtain the curved glass, wherein the staged heating is performed over stages which are different from each other in temperature, the staged forming is performed over stages which are different from each other in temperature, and during at least one of the stages, a varying pressure which varies from low pressure to high pressure is applied to the pattern die, and the staged cooling is performed by cooling the glass plate in the pattern die over stages which are different from each other in temperature, and wherein each of the number of the stages of the staged heating, that of the staged forming and that of the staged cooling is two or more.

The forming apparatus is, for example, a forming furnace. The forming furnace may be provided with only one position for placing the pattern die, and the glass is subjected to different temperatures and/or pressures over different stages by changing parameters of auxiliary components (e.g., a heating plate and a pressure applying device) in the furnace. Preferably, the forming furnace is provided with positions for placing the pattern die, the number of which is equal to or larger than a sum of the number of the stages of the staged heating, that of the staged forming and that of the staged cooling, so that parameters of auxiliary components in the forming furnace could keep constant, and the pattern die can be moved from one of the positions to another.

The forming method according to the present disclosure—which involves staged heating, staged forming and staged cooling—can be used to curve a thin glass panel while heating it, and produces a glass product with high dimensional accuracy, few appearance defects, even surfaces and beautiful appearance at a high yield. The glass product could be used as front and rear covers of electronic products including notebook computers, mobile phones, tablet computers and smart watches.

In an embodiment of the present disclosure, the staged heating is performed over the stages including a first stage, a second stage and a third stage. Each of the first stage, the second stage and the third stage has a constant temperature. A later stage among the first, second and third stages has a temperature higher than an earlier stage among them has. The first stage has a temperature of 300-450° C., the second stage has a temperature of 400-650° C., and the third stage has a temperature of 650-700° C. A temperature difference of 100-200° C. exists between adjacent two stages of the first, second and third stages.

In an embodiment of the present disclosure, the staged forming is performed over the stages including a fourth stage, a fifth stage and a sixth stage. Each of the fourth stage, the fifth stage and the sixth stage has a constant temperature. A later stage among the fourth, fifth and sixth stages has a temperature higher than an earlier stage among them has. The fourth stage has a temperature of 700-720° C., the fifth stage has a temperature of 700-730° C., and the sixth stage has a temperature of 700-750° C. A temperature difference of 3-20° C. exists between adjacent two stages of the fourth, fifth and sixth stages. A constant or varying pressure is applied to the pattern die during each of the fourth, fifth and sixth stages, and a varying pressure is applied to the pattern die during at least one of the fourth, fifth and sixth stages. A pressure applied during an earlier stage among the fourth, fifth and sixth stages is not higher than one applied during a later stage among them. A pressure of 0.02-0.1 MPa is applied during the fourth stage, a pressure of 0.02-0.3 MPa is applied during the fifth stage, and a pressure of 0.02-0.5 MPa is applied during the sixth stage.

In an embodiment of the present disclosure, the staged cooling is performed by cooling the pattern die over the stages including a seventh stage, an eighth stage, a ninth stage and a free stage. Each of the seventh stage, the eighth stage and the ninth stage has a constant temperature. A later stage among the seventh, eighth and ninth stages has a temperature lower than an earlier stage among them has. The seventh stage has a temperature of 500-600° C., the eighth stage has a temperature of 350-500° C., and the ninth stage has a temperature of 200-350° C. A temperature difference of 80-250° C. exists between adjacent two stages of the seventh, eighth and ninth stages. The free stage has a temperature not higher than the ninth stage has.

In the present disclosure, a varying pressure may be applied using a variable-pressure cylinder to the glass plate during the first through third stages. Preferably, a constant pressure is applied using an ordinary cylinder during each of the first, second and third stages. A pressure of a certain value that facilitates the heat transfer without breaking the glass plate before it softens is applied during each of the first, second, and third stages. The present disclosure does not intend to set any restriction on the pressure value applied during each of the first, second, and third stages. For example, a value of 0.005-1 MPa, preferably 0.01-0.5 MPa, and more preferably 0.015-0.1 MPa, is applied.

The first, second and third stages take an equal period of time so that an automated continuous process becomes possible. In an automated continuous process, while a first glass plate and the pattern die enter the second stage, a second glass plate and the pattern die enters the first stage. And so forth. The equal period of time may be, for example, 60-300 s.

In the present disclosure, a more usual condition is that the first stage has a temperature of 300-400° C., the second stage has a temperature of 400-600° C., and the third stage has a temperature of 650-700° C.

Parameters of the staged heating may be decided according to the shape and thickness of the product so that the pattern die and the glass plate are heated slowly and evenly rather than rapidly and abruptly—which may lead to cracking of the glass plate and residual stresses therein.

After the first, second and third stages, the temperature of the glass plate has approached or reached the softening point of the glass, and then the staged forming including the fourth, fifth and sixth stages is performed. Different kinds of glass have different softening points, but usual glass has a softening point of 650-750° C. Each of the stages of the staged forming does not need to have a temperature higher than the softening point of the glass because glass does not have to sufficiently soften to curve.

In the present disclosure, the varying pressure refers to a pressure that changes over a time. Take the pressure of 0.02-0.3 MPa, which is applied during the fifth stage, for example. During the whole fifth stage, the pressure may vary from 0.02 MPa to 0.04 MPa, from 0.05 MPa to 0.10 MPa, from 0.15 MPa to 0.3 MPa, or from 0.02 MPa to 0.3 MPa. These all fall into the scope of the present disclosure. The beginning pressure value and the ending pressure value of the varying pressure may be decided according to the thickness, shape and material of the flat glass plate. It should be understood by a person skilled in the art that in the present disclosure, the varying pressure means a pressure that changes from a low level to a high level so that the glass plate bears an increasing pressure. And the varying pressure may be a pressure that changes continuously over a time or a pressure that changes by two, three or more steps during one stage.

In the present disclosure, it is preferable that a constant pressure is applied during the fourth stage, and a varying pressure is applied during the fifth and sixth stages. Such an approach leads to the highest yield.

Preferably, the fourth, fifth and sixth stages take an equal period of time, and more preferably, the fourth, fifth and sixth stages take the same equal period of time that the first, second and third stages take, so that an automated continuous process becomes possible. The equal period of time may be, for example, 60-300 s.

Parameters of the staged forming, such as the temperature, pressure and time period, may be decided according to the shape and thickness of the product so that the glass panel does not deform too rapidly—leading to cracking of the glass panel, or too early—leading to such defects as pits and indentations.

With the glass plate going through each of the fourth, fifth and sixth stages, it curves more. At the end of the sixth stage, the pattern die has completely closed, and the glass plate has curved and reached a desired curvature.

In the present disclosure, a more usual condition is that the seventh stage has a temperature of 500-600° C., the eighth stage has a temperature of 400-500° C., and the ninth stage has a temperature of 200-300° C.

In an embodiment of the present disclosure, the free stage of the staged cooling may be divided into three stages of a tenth stage, a eleventh stage and a twelfth stage during each of which cooling water at a temperature of 20-30° C. is applied to the curved glass. The inventors found that if the three stages of the free stage took an equal period of time to that in the above described stages, the curved glass was cooled to room temperature after the three stages, thereby making it unnecessary for an operator to wear gloves to hold the glass and facilitating an industrial process.

In the present disclosure, a varying pressure may be applied using a variable-pressure cylinder to the pattern die and the glass plate during the seventh through ninth stages. Preferably, a constant pressure is applied using an ordinary cylinder to the pattern die and the glass plate during each of the seventh, eighth and ninth stages.

Preferably, a pressure equal to or higher than 0.02 MPa and equal to or lower than the highest pressure applied during the sixth stage is applied during the seventh through ninth stages. More preferably, a pressure of 0.05-0.11 MPa is applied during the seventh through ninth stages. Such an approach enables the formed glass plate not to restore itself and deform again during the cooling.

The present disclosure is not meant to place any restrictions on a pressure applied during the free stage. And any pressure is applicable, provided that the pressure applying device comes into contact with the pattern die. Of course, a little higher pressure (e.g., a pressure not higher than 1 MPa) would not influence the shape of the curved glass. A more usual condition is that an equal pressure, e.g., a pressure of 0.02 MPa, is applied during each of the tenth through twelfth stages.

Preferably, the seventh, eighth and ninth stages take an equal period of time, and more preferably, the seventh, eighth and ninth stages take the same equal period of time that the preceding stages take, so that an automated continuous process becomes possible. The equal period of time may be, for example, 60-300 s. It is preferable that the same time approach is taken for the stages of the free stage.

Parameters of the staged cooling may be decided according to the pattern die and the size and thickness of the product so that the pattern die is steadily and controllably cooled to room temperature. Cooling the pattern die at a controllable temperature through the seventh, eighth and ninth stages prevents the pattern die and the product from cooling rapidly—leading to cracking of the glass plate and residual stresses therein. Applying a certain pressure to the pattern die—which has finished the forming—enables the product not to restore itself and deform again. Such defects as pits and indentations could be avoided by moving the glass plate to the cooling stages immediately after the staged forming.

Figure 1:
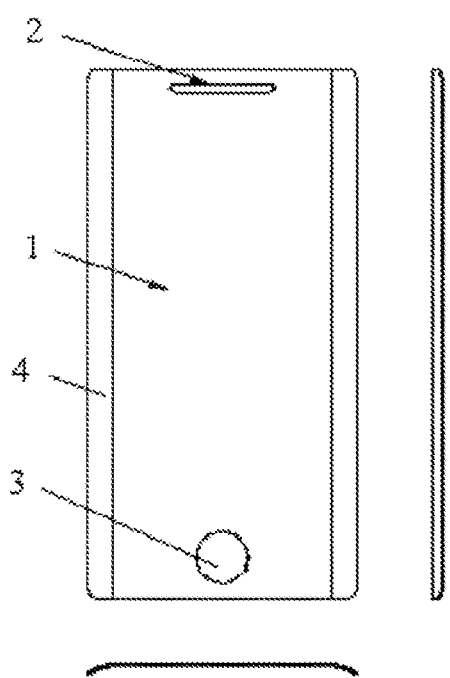
FIG. 1 is a schematic diagram showing a mobile phone's curved glass panel (wherein the curved surfaces are formed by curving the two long sides of a flat panel).

1: Flat Surface
2: Speaker Hole
3: Button Hole
4: Curved Surface

DETAILED DESCRIPTION

Preferable examples of the present disclosure will be described in detail in order for a person skilled in the art to understand the present disclosure's advantages and features more easily and thereby to define the present disclosure's scope of protection more clearly.

The following steps precede the method according to the present disclosure: preparing a stand-by flat glass plate by cutting a flat glass plate of a desired size, polishing the flat glass plate and making holes (e.g., a speaker hole, a button hole and a camera hole) on it; producing a die out of graphite so that it consists of a female die and a male die, with the curvature of the cavity formed between the female die and male die being equal to that of the curved surface of the curved glass panel to be produced; and placing the stand-by glass plate between the female and male dies so that the gaps between the pattern die and the four sides of the glass plate are all equal to or smaller than 0.02 mm, thereby ensuring that the glass plate does not move away from the die's center during the forming. Then, the loaded die will be placed into a forming furnace for being heated in the first stage.

The pattern die loaded with the flat glass plate is placed into a hot-curving forming apparatus (a forming furnace). A lower heating plate is used to heat the lower portion of the die, and an upper heating plate is used to heat and apply a pressure on the upper portion of the die. The upper heating plate is connected to a cylinder that is located above and pushes the upper heating plate downward and causes it to come into contact with the die and then withdraws the upper heating plate when the stage has finished. Then, the die loaded with the glass plate is transferred to next stage. Upper heating plate and lower heating plate are used throughout the first through ninth stages. During the free stage—which includes the tenth, eleventh and twelfth stages, an upper cooling plate and a lower cooling plate are used to cool the glass plate.

In the present disclosure, the upper heating plate's temperature may be set to be different from the lower heating plate's (but the difference is usually small), but a more usual case is that they are set to have the same temperature. In the present disclosure, a temperature of one of the stages refers to a temperature set for the upper heating plate during the stage unless specified otherwise. After the glass plate stays in one of the stages for a certain period of time such as 100s, its temperature has reached the temperature of the heating plate.

In the present disclosure, when a varying pressure which varies from a low pressure to a high pressure is applied during one or some of the fourth through sixth stages, a variable-pressure cylinder is employed. A variable-pressure cylinder differs from an ordinary cylinder (which applies a constant, preset pressure to the die) used in other stages in that after pressing the heating plate onto the die, it can increase the applied pressure.

After a curved glass produced using the method according to the present disclosure is taken out from the forming furnace, it is subjected to polishing and reinforcing processes. A reinforcing process is followed by screen printing and film coating. Consequently, a curved glass product is produced. The glass product may be a glass panel shown in FIG. 1, in which the two long sides are curved to form curved surfaces. It is also possible to curve a plate's two short sides or four sides, or a whole plate. The method according to the present disclosure is applicable to produce a glass panel with any curved surface, so long as a corresponding pattern die can be devised. In the present disclosure, after being formed, the glass panel does not need to be subjected to shape processing or drilling. Therefore, the method dispenses with many procedures and thus saves time, and has an improved yield.

Example 1

Take a glass plate with a thickness T of 0.7 mm for example. Parameters were set as below.

During the first through third stages in the staged heating, the temperature set for the upper heating plate was the same as that for the lower one. Temperatures of 360° C., 560° C. and 700° C. were set for the first, second and third stages, respectively. A pressure of 0.02 MPa was applied during each of the first through third stages—which led to a gentle pressure contact between the upper heating plate and the pattern die. In this example, when a pattern die reached the position corresponding to the first stage in the heating furnace, the cylinder drove the upper heating plate to press and heat it. The die stayed in the first stage for 100 s. 100 s later, the die together with the glass plate reached the position corresponding to the second stage in the furnace while a second die loaded with a glass plate reached the position corresponding to the first stage. Such successiveness brings about continuous forming. After the first pattern die reached the position corresponding to the third stage and stayed for 100 s, the temperature of the flat glass plate in the pattern die had reached the softening point of the glass. Parameters of the staged heating may be decided according to the shape and thickness of the product so that the pattern die and the glass plate are heated slowly and evenly rather than rapidly and abruptly—which may lead to cracking of the glass plate and residual stresses therein.

After the staged heating, the glass plate has been heated to the softening point, and then the die together with the glass plate was subjected to the staged forming consisting of the fourth through sixth stages, so as to deform the glass plate in the pattern die. Each of these three stages curved the flat glass plate to such an extent that the plate reached one third of the preset curvature. When the sixth stage has finished, the pattern die closed completely, and the forming accomplished. Temperatures of 700° C., 705° C. and 710° C. were set for the fourth, fifth and sixth stages, respectively. A constant pressure of 0.03 MPa was applied during the fourth stage, a pressure increasing from 0.03 MPa to 0.08 MPa was applied during the fifth stage, and a pressure increasing from 0.08 MPa to 0.12 MPa was applied during the sixth stage. Each of these three stages took 100 s. Parameters of the staged forming may be decided according to the shape and thickness of the product so that glass plates of different shapes and different thicknesses can be formed into a desired product. Such staged forming is applicable, especially, to a thin glass panel that is liable to crack when being curved during heating, and is capable of preventing the glass plate from deforming too rapidly—leading to cracking of the glass panel—and from deforming too early—leading to such defects as pits.

After the staged forming, the glass plate entered the staged cooling immediately. In this example, the staged cooling consisted of six stages. The former three stages were controlled cooling stages, and the later three stages used cooling water to naturally cool the die. With each of the cooling stages passing, the die gradually cooled to room temperature (20-30° C.). Temperatures of 560° C., 400° C. and 300° C. were set for the former three stages, i.e., the seventh, eighth and ninth stages, respectively. Cooling water used in the later three stages had a temperature of 22° C. A pressure of 0.1 MPa was applied during the seventh through ninth stages. A pressure of 0.02 MPa was applied during the later three stages. Each of the six stages took 100 s. Parameters of the staged cooling may be decided according to the pattern die and the size and thickness of the product so that the pattern die is steadily and controllably cooled to room temperature. Cooling the pattern die at a controllable temperature through the seventh, eighth and ninth stages prevents the pattern die and the product from cooling rapidly—leading to cracking of the glass plate and residual stresses therein. Applying a certain pressure during the seventh through ninth stages to the pattern die—which has finished the forming—enables the product not to restore itself and deform again. Such defects as pits and indentations could be avoided by moving the glass plate to the cooling stages immediately after the staged forming.

After the pattern die and the glass plate were cooled to room temperature, the glass plate was taken out from the pattern die. The curved glass was found to be free of pits and severe indentations, and have dimensional accuracy of ±0.05 mm and surface irregularity below 0.1 mm. Even if slight indentations are formed on the curved glass or dust adheres to it during the forming, the curved glass can still have high appearance quality by sweeping over and rubbing its surfaces with a brush. A curved glass product may be obtained by subjecting the curved glass to reinforcing, screen printing, coloring, film coating and the like.

It should be understood by a person skilled in the art that the above embodiments serve to describe the present disclosure and are not meant to limit it. Any variants and modifications of those embodiments fall within the present disclosure's scope of protection if they do not depart from the spirit of the present disclosure.

What is claimed is:

1. A forming method for curved glass, comprising:
   placing a flat glass plate in a pattern die;
   placing the pattern die in a forming apparatus; and
   subjecting the pattern die successively to staged heating, staged forming and staged cooling, so as to obtain the curved glass;
   wherein:
   the staged heating is performed over stages which are different from each other in temperature, each of the stages of the staged heating being performed under a first pressure applied to the pattern die and each being associated with a heating period of time,
   the staged forming is performed over stages which are different from each other in temperature, each of the stages of the staged forming being associated with a forming period of time, and the stages of the staged forming comprise a stage with a second pressure applied to the pattern die followed by at least one stage with a varying pressure applied to the pattern die which varies, over the course of the at least one stage, from the second, lower pressure to a third, higher pressure,
   the staged cooling is performed over stages which are different from each other in temperature, each of the stages of the staged cooling being performed under a fourth pressure applied to the pattern die and each being associated with a cooling period of time,
   each of the number of the stages of the staged heating, that of the staged forming and that of the staged cooling is two or more.

2. The forming method according to claim 1, wherein:
   the staged heating is performed over the stages comprising a first stage, a second stage and a third stage;
   each of the first stage, the second stage and the third stage has a constant temperature, and a later stage among the first, second and third stages has a temperature higher than an earlier stage among the first, second and third stages;
   the first stage has a temperature of 300-450° C., the second stage has a temperature of 400-650° C., and the third stage has a temperature of 650-700° C.; and
   a temperature difference of 100-200° C. exists between adjacent two stages of the first, second and third stages.

3. The forming method according to claim 2, wherein:
   the staged forming is performed over the stages comprising a fourth stage, a fifth stage and a sixth stage;
   each of the fourth stage, the fifth stage and the sixth stage has a constant temperature, and a later stage among the fourth, fifth and sixth stages has a temperature higher than an earlier stage among the fourth, fifth and sixth stages;
   the fourth stage has a temperature of 700-720° C., the fifth stage has a temperature of 700-730° C., and the sixth stage has a temperature of 700-750° C.;
   a temperature difference of 3-20° C. exists between adjacent two stages of the fourth, fifth and sixth stages;
   the second pressure is applied to the pattern die during the fourth stage, and the varying pressure is applied to the pattern die during at least one of the fifth and sixth stages;
   a pressure applied during an earlier stage among the fourth, fifth and sixth stages is not higher than one applied during a later stage among them; and
   a pressure of 0.02-0.1 MPa is applied during the fourth stage, a pressure of 0.02-0.3 MPa is applied during the fifth stage, and a pressure of 0.02-0.5 MPa is applied during the sixth stage.

4. The forming method according to claim 3, wherein:
   the staged cooling is performed over the stages comprising a seventh stage, an eighth stage, a ninth stage and a free stage;
   each of the seventh stage, the eighth stage and the ninth stage has a constant temperature, and a later stage among the seventh, eighth and ninth stages has a temperature lower than an earlier stage among the seventh, eighth and ninth stages;

the seventh stage has a temperature of 500-600° C., the eighth stage has a temperature of 350-500° C., and the ninth stage has a temperature of 200-350° C.;

a temperature difference of 80-250° C. exists between adjacent two stages of the seventh, eighth and ninth stages; and the free stage has a temperature not higher than a temperature of the ninth stage.

5. The forming method according to claim 2, wherein the first pressure during each of the first, second and third stages is within a range of 0.015-0.1 MPa.

6. The forming method according to claim 3, wherein the varying pressure is applied during both the fifth and the sixth stages.

7. The forming method according to claim 4, wherein the free stage is divided into three stages of a tenth stage, a eleventh stage and a twelfth stage, and during the free stage, cooling water at a temperature of 20-30° C. contacts a surface of the pattern die, thereby cooling the glass plate in the pattern die.

8. The forming method according to claim 4, wherein the fourth pressure is equal to or greater than 0.02 MPa and is constant during each of the seventh, eighth, and ninth stages.

9. The forming method according to claim 8, wherein the fourth pressure during each of the seventh, eighth, and ninth stages is within a range of 0.05-0.11 MPa.

10. The forming method according to claim 4, wherein the first through ninth stages take an equal period of time of 60-300s.

\* \* \* \* \*